(12) United States Patent
Kim et al.

(10) Patent No.: US 6,625,386 B1
(45) Date of Patent: Sep. 23, 2003

(54) METHOD FOR CREATING, UPDATING, AND RECORDING SEAMLESS PRESENTATION INFORMATION OF MOVING PICTURE DATA IN A REWRITABLE RECORDING MEDIUM

(75) Inventors: Byung-Jin Kim, Kyunggido (KR); Kang-Soo Seo, Kyunggido (KR); Ki-Won Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/245,855

(22) Filed: Feb. 8, 1999

(30) Foreign Application Priority Data

Aug. 18, 1998 (KR) .............................. 98-33858

(51) Int. Cl.[7] .................................. H04N 5/93
(52) U.S. Cl. ...................... 386/52; 386/95; 386/125; 386/126
(58) Field of Search .................. 386/52.55, 125–126, 386/95, 68, 69, 70; H04N 5/53

(56) References Cited

U.S. PATENT DOCUMENTS 5,923,869 A * 7/1999 Kashiwagi et al. ......... 713/501
6,181,870 B1 * 1/2001 Okada et al. ................ 386/95

FOREIGN PATENT DOCUMENTS

JP  1064246  3/1998
JP  1083662  3/1998

OTHER PUBLICATIONS

Copy of Korean Patent Office Action, Nov. 17, 2000.

* cited by examiner

*Primary Examiner*—Vincent Boccio
(74) *Attorney, Agent, or Firm*—Birch, Stewart, Kolasch & Birch, LLP

(57) ABSTRACT

This invention provides a method for creating, updating, and recording information for seamless presentation of moving picture data in a rewritable recording medium. When recording moving picture data on a rewritable recording medium, seamless presentation information, a part of navigation data, is recorded along with the picture data for seamless presentation of the recorded picture data. The method for creating and recording seamless presentation information of the present invention can effectively reduce the amount of created seamless presentation information by omitting some fields of the seamless presentation information when they are unnecessary. If some video objects of recorded picture data are erased, navigation data related to the removed video objects should be erased and seamless presentation information should also needs proper modification. The method for updating and recording seamless presentation information of the present invention enables effective management of seamless presentation information by updating seamless presentation information related to the video object following erased video objects.

29 Claims, 10 Drawing Sheets

FIG. 7A

| Seamless Information (SMLI) | VOB_V_S_PTM |
| | VOB_V_E_PTM |
| | VOB_A_STP_PTM |
| | VOB_A_GAP_LEN |
| | SML_FLG = 0 |

FIG. 7B

| Seamless Information (SMLI) | VOB_V_S_PTM |
| | VOB_V_E_PTM |
| | VOB_A_STP_PTM |
| | VOB_A_GAP_LEN |
| | SML_FLG = 1 |
| | VOB_FIRST_SCR |
| | VOB_LAST_SCR |

METHOD FOR CREATING, UPDATING, AND RECORDING SEAMLESS PRESENTATION INFORMATION OF MOVING PICTURE DATA IN A REWRITABLE RECORDING MEDIUM

BACKGROUND OF THE INVENTION

1. Field of the Invention

The present invention relates generally to a method for creating, updating, and recording seamless presentation information of moving picture data in a rewritable recording medium, and more particularly, but not by way of limitation, to a method for creating seamless presentation information with no unnecessary information fields and for effectively updating seamless presentation information when some video objects are erased.

2. Description of the Related Art

Optical disks have come into wide use since the advent of compact disc (CD) and the demand for optical disks is expected to grow steadily with popularization of digital versatile disk (DVD). Optical disks include read-only disks such as CD-ROM and DVD-ROM, write-once disks such as CD-R and DVD-R, and rewritable disks such as CD-RW and DVD-RAM. The specification of DVD-RTRW, which is standard writing/reading format of a rewritable disc, has not released yet and standardization for the DVD-RTRW is under way.

As rewritable optical disks like DVD-RAM are of immensely large capacity, users may store a variety of data such as moving pictures, still pictures, audio data, and the like on a single recording medium. Each time a new data file is recorded on a rewritable recording medium, navigation information for locating the data file after recording is created and recorded along with the data file on the recording medium. The recorded navigation information is referred to whenever the relevant data file is accessed.

Navigation information regarding all data files stored on a recording medium is contained in a navigation data table as shown in FIG. 1, which is recorded as a single navigation data file on the recording medium. Accessing the recording medium entails loading the navigation data file into a memory, wherein the navigation data reside all the time. When recording a moving or still picture on the recording medium, the area in which the picture file will be recorded is determined with reference to the navigation information. Recording a picture file always accompanies creating management information regarding the recorded picture file and updating the navigation data file to include the newly created management information.

Management data pertaining to moving pictures comprise movie video object information (M_VOBI) and movie video object presentation order information (Cell Information or simply CI). Suppose that a moving picture file is composed of n movie video objects (M_VOBs) M_VOB#1~M_VOB#n as shown in FIG. 2. Then, n M_VOBIs (M_VOBI#1~M_VOBI#n in FIG. 2) and n CIs (CI#1, CI#2, CI#4, . . . shaded in FIG. 2) corresponding to the n M_VOBs are created in the same order that the n M_VOBs are recorded. The created M_VOBIs and CIs are stored in the movie A/V file information table (M_AVFIT) and the original program chain information table (ORG_PGCIT) of the navigation data shown in FIG. 1, respectively.

When the recording medium is accessed, the navigation data file is read from the recording medium and loaded into a memory as mentioned before. If reproduction of a moving picture is requested, M_VOBIs and CIs relevant to the requested moving picture file are read from the M_AVFIT and ORG_PGCIT of the navigation data table, respectively. In reference to the obtained M_VOBIs and CIs, the requested moving picture file can be located from the recording medium and reproduced.

As shown in FIG. 1, the movie A/V file information table (M_AVFIT) comprises movie A/V file information table information (M_AVFITI) wherein information on the M_AVFIT such as the end address of the M_AVFIT is stored and movie A/V file information (M_AVFI#1). The M_AVFI#1 further comprises movie A/V file general information (M_AVFGI) wherein general information on the M_AVFI such as the number of M VOBIs contained in the M_AVFI is stored and M_VOBIs, M_VOBI#1~M_VOBI#n. Each of M_VOBIs comprises movie VOBI general information (M_VOBIGI) wherein the ID code of the relevant VOB is stored, movie VOB stream information (M_VOB_STI) wherein video and audio attributes of the relevant VOB is stored, seamless presentation information (SMLI) wherein information for seamless presentation of successive MOVs (M_VOB#i and M_VOB#i+1, i=1~n) is stored, and time map information (TMAPI) wherein information for special playback or time search is stored.

A moving or still picture file is recorded on the recording medium as a group of video objects (VOBs). For reproducing moving picture data received and recorded as successive data stream, it is necessary to present the relevant VOBs seamlessly. On the other hand, seamless presentation is not always necessary for moving picture data obtained through repeated recording-stop process. If successively inputted picture data contain still pictures as well as moving pictures, the picture data are recorded being classified into movie VOBs (M_VOBs) and still picture VOBs (S_VOBs). In this case, seamless presentation between the group of M_VOBs and the group of S_VOBs is not necessary, either.

When recording received picture data on the recording medium, it is therefore necessary to create information on whether to present successive VOBs forming the picture data seamlessly so that the information can be used in the course of data reproduction. Such information is recorded in the SMLI of the navigation data table shown in FIG. 1.

As shown in FIG. 1, the SMLI comprises a seamless presentation flag (SML_FLG) which indicates how to present the relevant VOB after the preceding VOB is presented (for example 1 indicates seamless presentation is needed, while 0 indicates seamless presentation is not necessary), the presentation start time of the first video field of the relevant VOB (VOB_V_S_PTM), the presentation end time of the last video field of the relevant VOB (VOB_V_E_PTM), system clock reference (SCR) of the first pack of the relevant VOB (VOB_FIRST_SCR), system clock reference of the last pack of the preceding VOB (VOB_LAST_SCR), VOB audio stop time (VOB_A_STP_PTM) which denotes pause time of audio at discontinuity in RTRW's PTM describing format between the current VOB and the preceding VOB, and VOB audio gap length (VOB_A_GAP_LEN) which denotes the discontinuity period at discontinued point between the current VOB and the preceding VOB.

As depicted in FIG. 3, a M_VOB is composed of a plurality of video object units (M_VOBUs), each of which comprises a plurality of video packs (V_PAKs), subpicture packs (SP_PAKs), and audio packs (A_PACKs).

The V_PAKs of each M_VOB are coded by MPEG-2 video encoding method. The first V_PAK comprises a pack header, a system header, a packet header, and video data as shown in FIG. 4A, while each of the other V_PAKs comprise a pack header, a packet header, and video data as shown in FIG. 4B. The system clock reference (SCR) and presentation time stamp (PTS) needed for presentation of the video pack are recorded in the pack header and packet header, respectively.

The A_PAKs of each M_VOB are coded by one of the following encoding methods: linear PCM coding as shown in FIG. 5A, Dolby AC-3 coding as shown in FIG. 5B, and MPEG-2 audio coding as shown in FIG. 5C. Without regard to the adopted encoding method, the SCR and PTS are recorded in the pack header and packet header, respectively.

A M_VOB comprises multiple top fields (or even fields) and bottom fields (or odd fields) as shown in FIG. 6, and a pair of top and bottom fields forms a frame. The PTS of the first field of the M_VOB amounts to the presentation start time of the VOB (VOB_V_S_PTM) and the sum of the PTS of the last field and ⅟₆₀ sec amounts to the presentation end time of the VOB (VOB_V_E_PTM).

As mentioned earlier, seamless presentation of audio and video data may not be necessary provided the moving picture is taken through repeated record-stop process or the picture data contain both moving and still picture data. In such cases, therefore, the fields of VOB_FIRST_SCR and VOB_LAST_SCR in the SMLI are unnecessary since such fields are utilized only for seamless presentation of successive VOBs.

In conventional navigation data structures, whether the fields may be necessary or not, every SMLI contains the fields of VOB_FIRST_SCR and VOB_LAST_SCR, which unnecessarily increases the amount of navigation data. Moreover, when some VOBs are erased from picture data, the SMLI of the VOB following the removed VOB should be appropriately dealt with, which has not been sufficiently considered.

SUMMARY OF THE INVENTION

It is therefore an object of the present invention to provide a method for creating and recording seamless presentation information needed for seamless presentation of successive video objects of moving picture data, which reduces the amount of resulting seamless presentation information data.

It is another object of the present invention to FM provide a method for updating and recording seamless presentation information when some video objects of recorded moving picture data are deleted, which enables effective management of seamless presentation information data by appropriately updating the navigation data related to the video object following the erased video objects.

The method for creating and recording seamless presentation information of the present invention comprises the steps of recording picture data being received on the recording medium by grouping the data into video objects; determining whether to specify two successive video objects as a pair of video objects to be presented seamlessly; and setting a seamless presentation flag contained in seamless presentation information of the latter of the two successive video objects depending upon the determination result, and creating optional information fields in the seamless presentation information based on the seamless presentation flag value.

The method for updating and recording seamless presentation information of the present invention comprises the steps of erasing video objects asked to be deleted; and updating seamless presentation information of the video object following the erased video objects.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 7A and 7B are schematic diagrams showing the structure of seamless presentation information according to an embodiment of the present invention;

DETAILED DESCRIPTION OF THE PREFERRED EMBODIMENTS

The preferred embodiments of the present invention will be described in detail referring to the accompanying drawings.

FIGS. 7A and 7B show the seamless presentation information (SMLI) of the navigation data according to an embodiment of the present invention.

FIG. 7A depicts the SMLI wherein the SML_FLG is 0 indicating that seamless presentation of successive video objects is not needed. Such SMLI can be created when moving picture data are obtained in one place and obtained again in another place after a time interval, or moving picture data and still picture data are received successively.

FIG. 7B depicts the SMLI wherein the SML_FLG is 1 indicating that seamless presentation of successive video objects is required. When moving picture data are received and recorded as successive data stream with no additional time gap, the relevant VOBs need seamless presentation. In this case, the SMLI shown in FIG. 7B is created.

As depicted in FIGS. 7A and 7B, the method for creating seamless presentation information of moving picture data according to an embodiment of the present invention creates SMLI of a different structure depending on the value of the SML_FLG. If the SML_FLG of SMLI is 0, then the VOB_FIRST_SCR and VOB_LAST_SCR of the SMLI are not needed so such fields are not created. As a result, the fields of VOB_FIRST_SCR and VOB_LAST_SCR are created only when the SML_FLG is 1, thereby reducing the amount of seamless presentation information contained in the navigation data.

Figure 8:
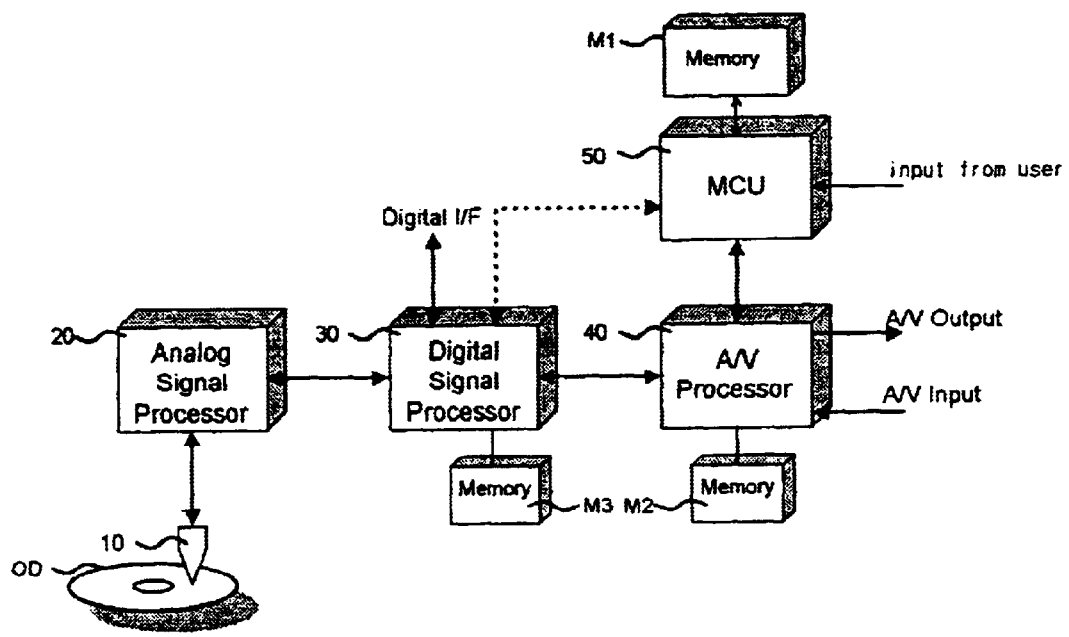
FIG. 8 is a schematic diagram of an optical disk recording/reproducing apparatus embodying the present invention.

FIG. 8 shows a schematic diagram of an optical disk recording/reproducing apparatus embodying the present invention.

The apparatus comprises an optical pickup 10 for recording/reproducing information on/from a recording medium OD, an analog signal processing unit 20 for filtering and digitizing high-frequency analog signals reproduced from the recording medium OD and converting digital data to be recorded on the recording medium OD into analog signals, a digital signal processing unit 30 for decoding and encoding digital data and yielding a control signal for data synchronism, an A/V data processing unit 40 for decoding audio/video input data, hereinafter referred to simply as A/V data, and encoding audio/video input signals into A/V data, a control unit 50 for controlling general operation of the apparatus in response to a user's requests, and a plurality of memories M1, M2, and M3 for storing temporary data created in each signal processing phase. All these components are operatively coupled. The navigation data file is loaded into the memory M1.

When recording a moving picture data on the recording medium OD in the apparatus shown in FIG. 8, first of all the control unit 50 loads the navigation data file recorded on the recording medium OD into the memory M1. Referring to the loaded navigation data, the control unit 50 records the picture data on the recording medium OD and creates management information regarding the recorded picture data. The created management information is added to the navigation data file loaded in the memory M1.

Figure 1:
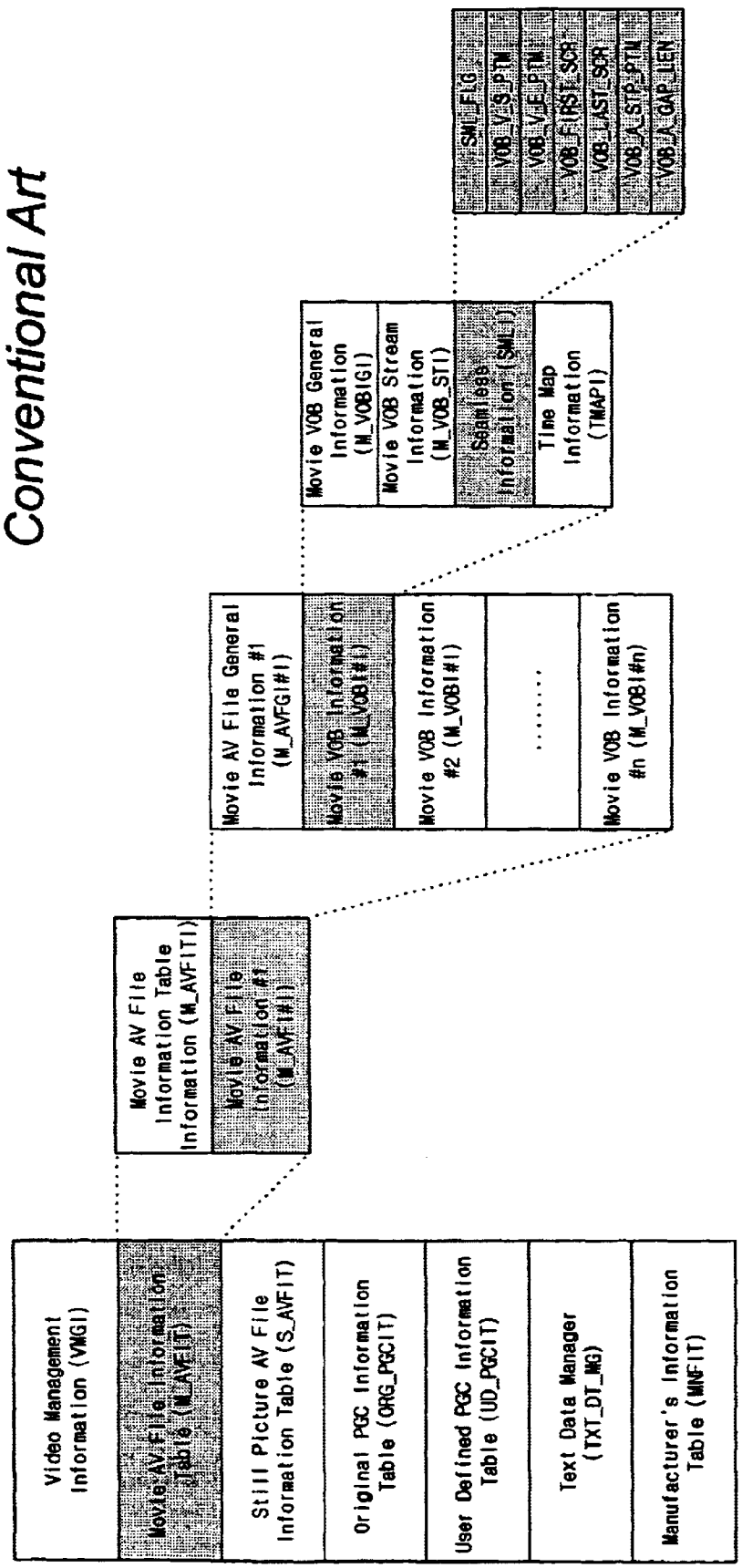
FIG. 1 is a table showing a structure of conventional navigation data for managing picture data recorded on a rewritable recording medium.
Figure 2:
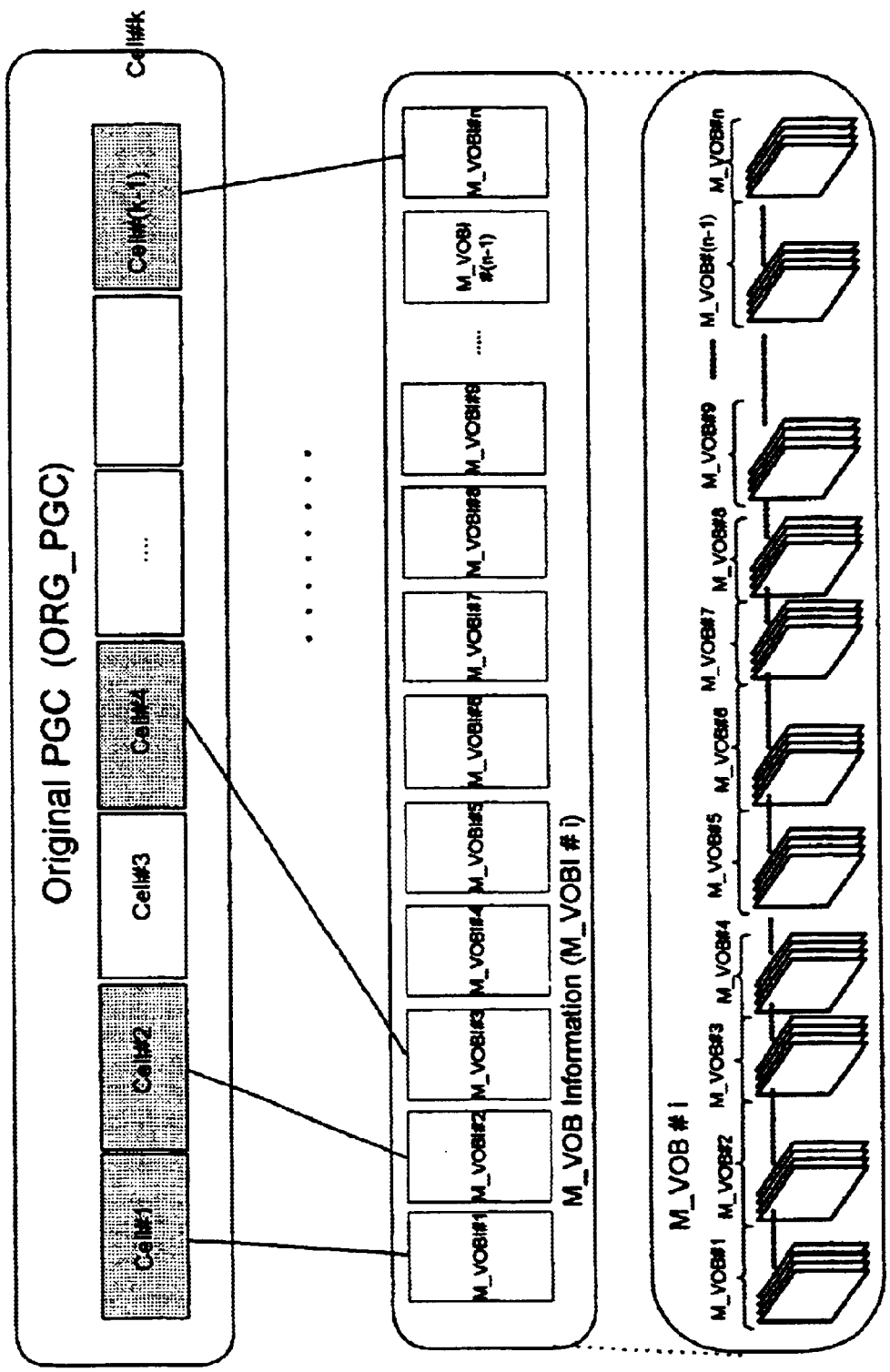
FIG. 2 is a schematic diagram illustrating the process of creating navigation data when recording moving picture data on a rewritable recording medium.
Figure 3:
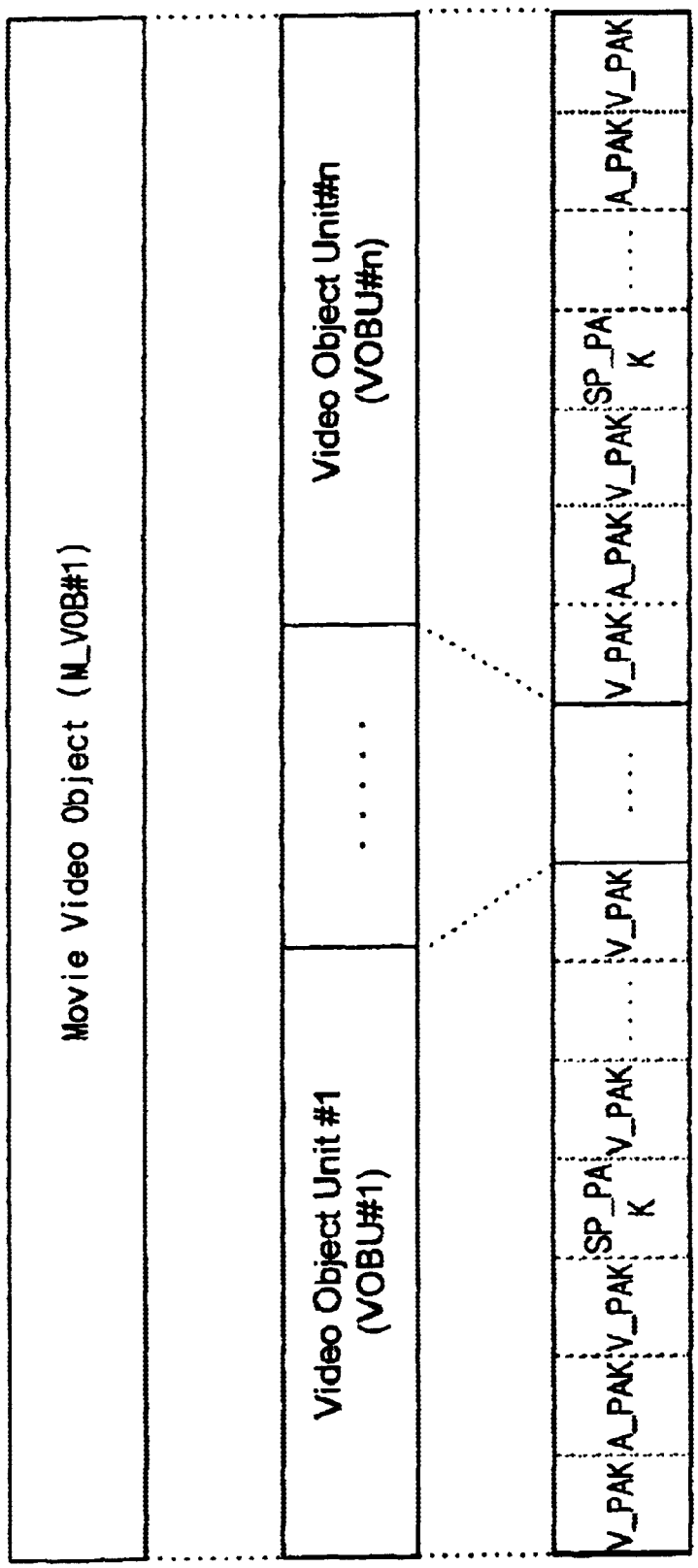
FIG. 3 is a schematic diagram showing the structure of movie video object shown in FIG. 2.
Figure 4A:
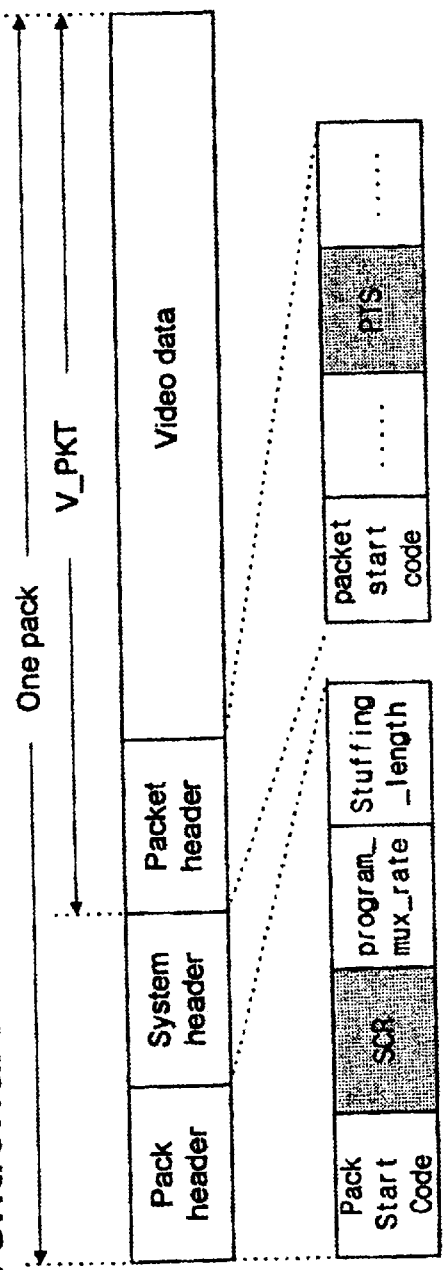
FIGS. 4A and 4B are schematic diagrams showing the structure of a video pack shown in FIG. 3.
Figure 4B:
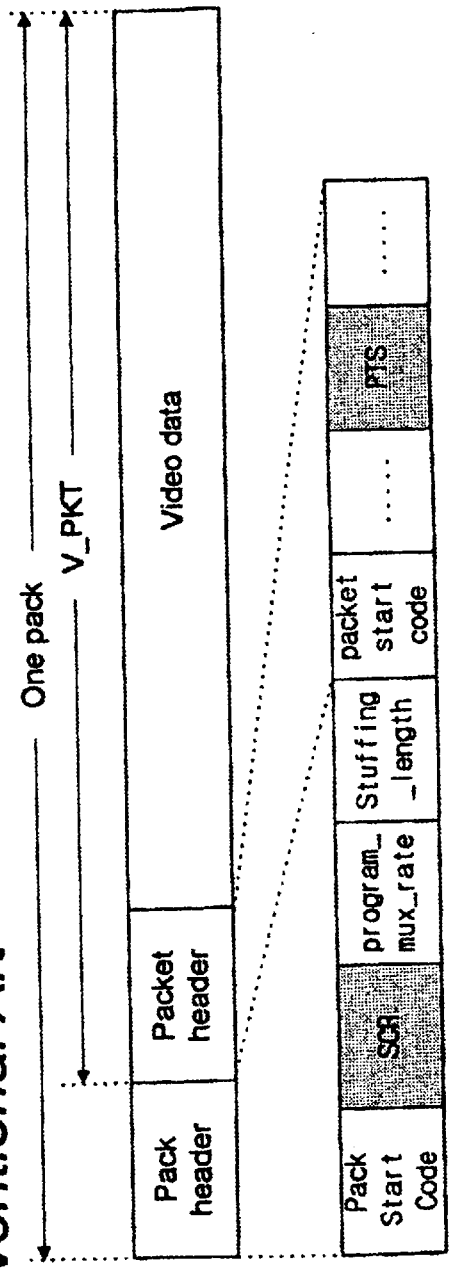
Figure 5A:
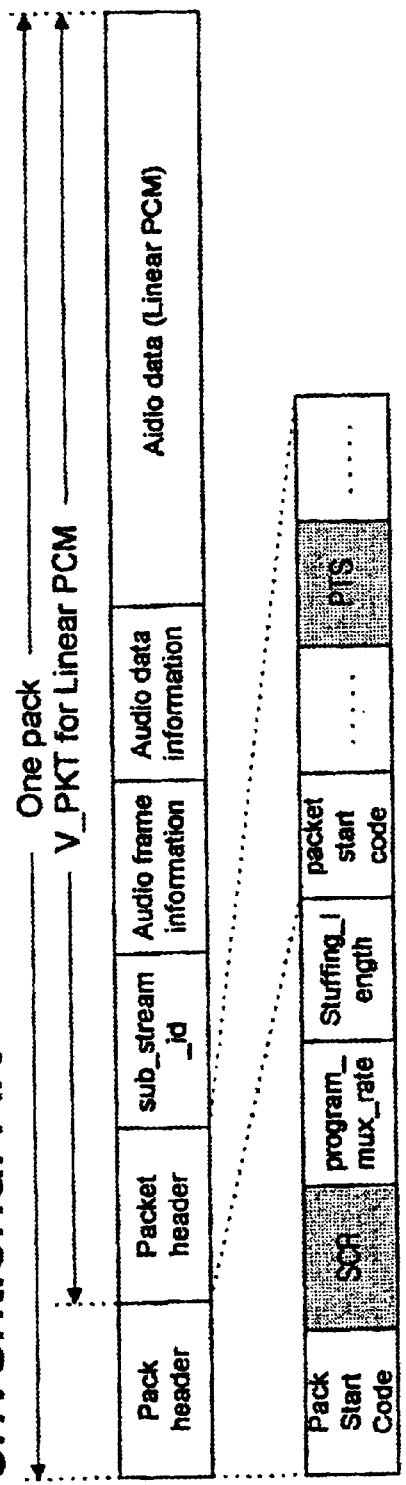
FIGS. 5A, 5B, and 5C are schematic diagrams showing the structure of an audio pack shown in FIG. 3.
Figure 5B:
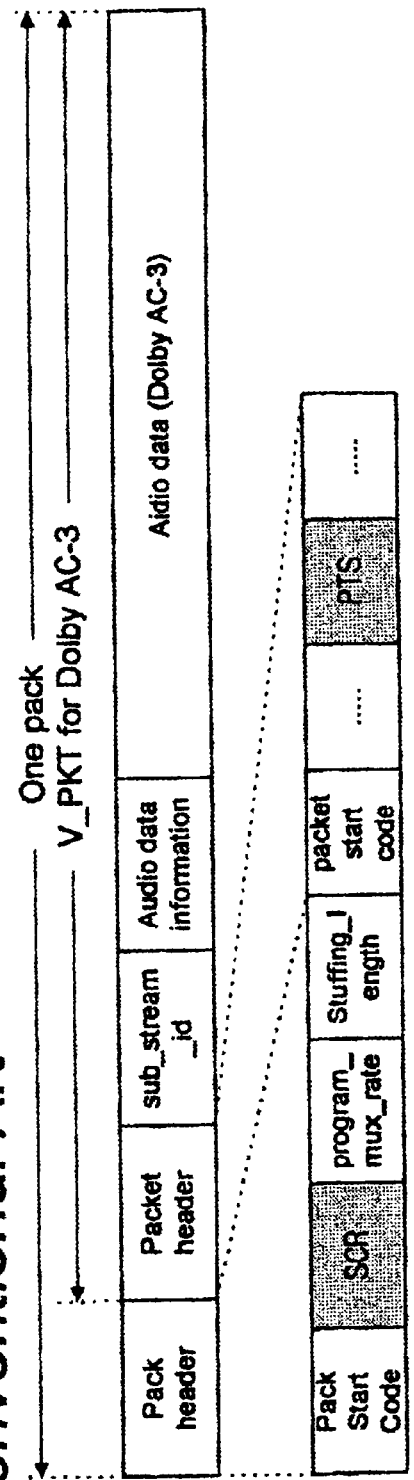
Figure 5C:
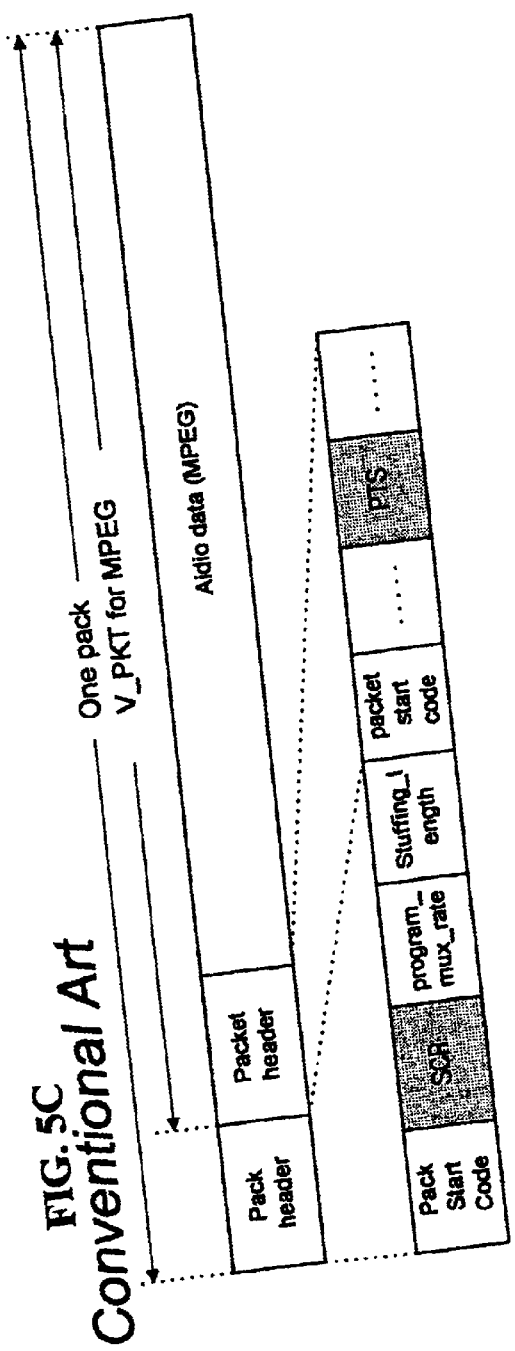
Figure 6:
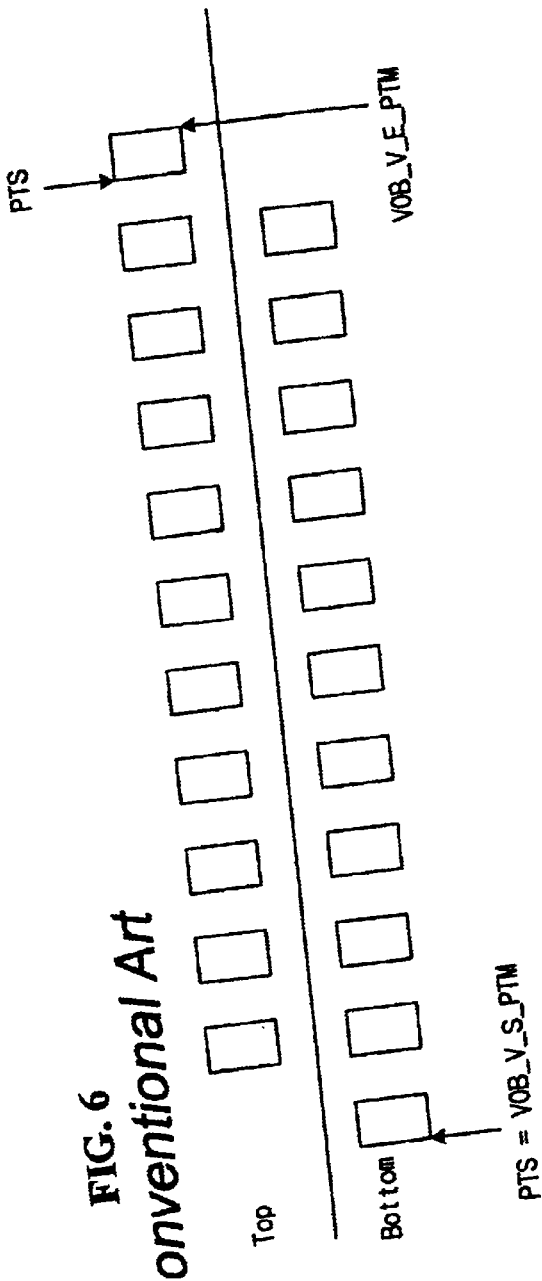
FIG. 6 is a schematic diagram to explain video presentation start time (VOB_V_S_PTM) and end time (VOB_V_E_PTM) of a video object.

The moving picture data are recorded on the recording medium as a group of video obejcts (M_VOB#1~M_VOB#n shown in FIG. 2). The video object information M_VOBIs (M_VOB#1~M_VOBI#n shown in FIG. 2) are created in the same order of M_VOBs. Also cell information CIs (Cell#1, Cell#2, Cell#4, . . . shown in FIG. 2) are created also in the same order and the created CIs are recorded sequentially in the original program chain information table (ORG_PGCIT) of the navigation data table shown in FIG. 1.

Suppose that in FIG. 2, Cell#l, Cell#2, Cell#2, . . . Cell#n are related to moving picture data, while Cell#3 is related to still picture data. Then VOBIs, M_VOBI#1 and M_VOBI#2, are information on M_VOB#1 and M VOB#2 recorded successively on the recording medium. The SML_FLG of the SMLI of VOBI#2, therefore, is set as shown in FIG. 7B and the first SCR of M_VOB#2 and the last SCR of the preceding VOB, M_VOB#1 are recorded in the fields of VOB_FIRST_SCR and VOB_LAST_SCR of M_VOB#2, respectively.

In contrast, M_VOB#2 and M_VOB#3 are not recorded in succession since there is a still picture video object (not shown in FIG. 2) recorded in between. Hence, M_VOB#3 does not need to be presented seamless after the preceding still picture video object is presented. As a result, the SML_FLAG of the SMLI of M_VOBI#3 is cleared and the SMLI does not contain the fields of VOB_FIRST_SCR and VOB_LAST_SCR as shown in FIG. 7A.

Provided a user records moving picture data and resumes recording of moving picture data after a time interval, the SMLI of the first M_VOBI of the newly recorded picture data does not include the fields of VOB_FIRST_SCR and VOB_LAST_SCR as shown in FIG. 7A since the SML_FLG of the SMLI is 0. Decision about whether to create the fields or whether to set the SML_FLG is made by the control unit 50.

Even though recording of moving picture data is resumed after a time interval, the previously recorded data and newly recorded data can be presented in succession if the user requests seamless presentation. The control unit 50 tests if the user chooses the recording mode which requests seamless presentation of moving picture data when resuming recording. If so, the control unit 50 sets the SML_FLG of the first M_VOBI of newly recorded picture data and creates SMLI with the fields VOB_FIRST_SCR and VOB LAST_SCR. The first SCR of the current VOB is recorded in the VOB_FIRST_SCR and the last SCR of the preceding VOB is recorded in the VOB_LAST_SCR.

If a request to erase a VOB, say VOB#i, is received, the control unit 50 erases the VOBI and CI corresponding to the VOB and erases the VOB from the recording medium. And then, the control unit 50 updates navigation information of the M_VOB following the removed VOB. More specifically, the SML_FLG of M_VOBI#(i+1) is cleared and the VOB_FIRST_SCR and VOB_LAST_SCR fields are removed from the VOBI. In addition, the fields of VOB_A_STP_PTM and VOB_A_GAP_LEN are updated.

The method for creating and recording seamless presentation information of moving picture data in a rewritable recording medium according to an embodiment of the present invention is explained below in detail with reference to the flow chart shown in FIG. 9.

Figure 9:
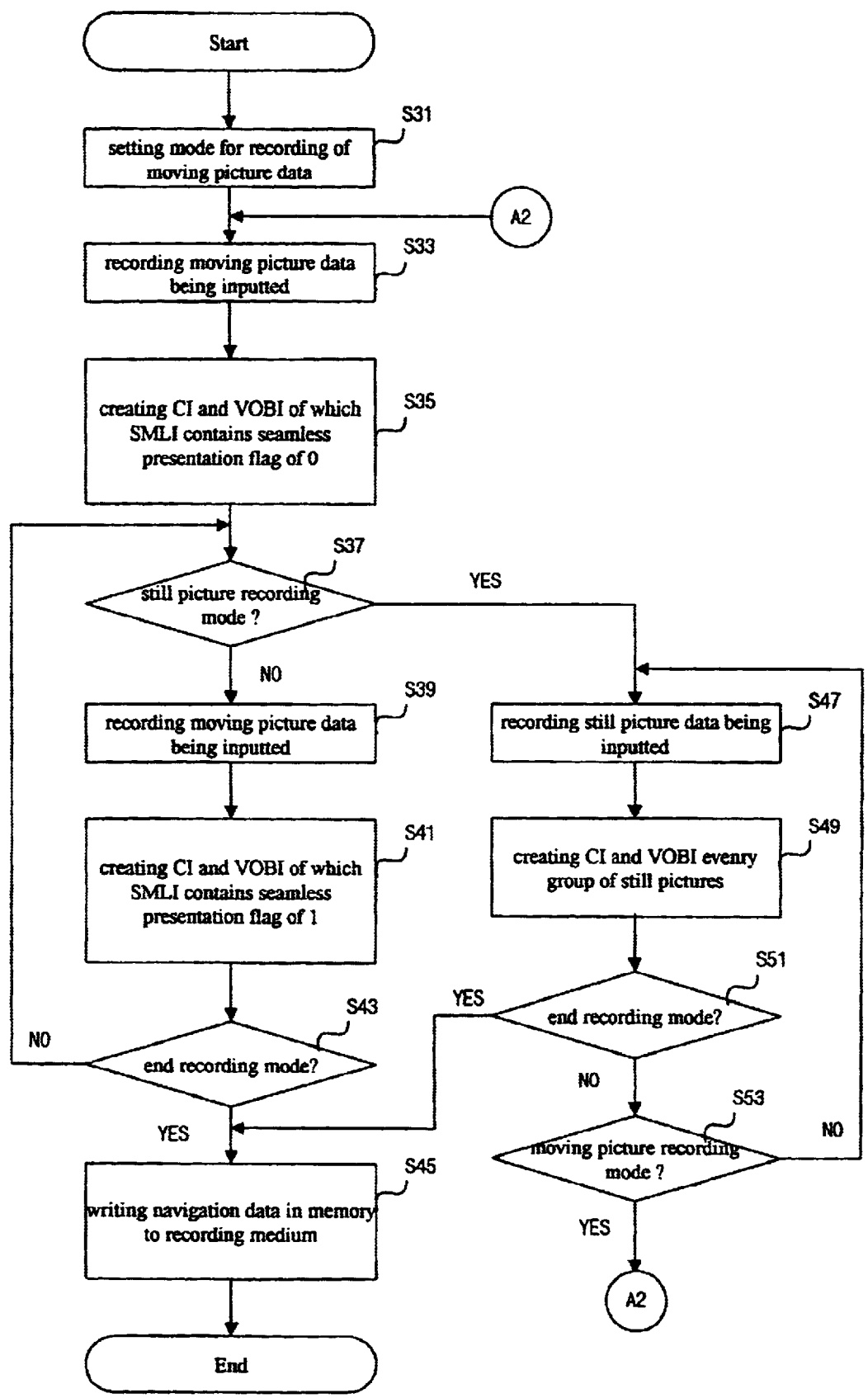
FIG. 9 is a flow chart showing the method for creating and recording seamless presentation information of moving picture data in a rewritable recording medium according to an embodiment of the present invention.

Referring to FIG. 9, if recording of moving picture data has been requested, the control unit 50 begins execution of a recording control routine, loading the navigation data file from the recording medium into the memory M1 (S31). Also, the control unit 50 controls the A/V data processing unit 40, the digital signal processing unit 30, and the analog signal processing unit 20, so that the moving picture obtained from an external device is recorded on the recording medium OD (S33).

The input data are recorded on the recording medium OD as a series of M_VOBs. The control unit 50 creates M_VOBIs corresponding to the VOBs and adds the M_VOBIs to the M_AVFIT of the navigation data loaded in the memory M1. The SML_FLG of the first M_VOBI is 0 and the SMLI does not contain the fields of VOB_FIRST_SCR and VOB_LAST_SCR, because the first VOB needs not to be presented seamlessly with the last M_VOB of the previously recorded picture data. Also, the control unit 50 creates CIs corresponding to the recorded VOBs and adds the CIs to the ORG_PGCIT of the navigation data stored in the memory M1 (S35).

Continuing at step S37, the control unit 50 tests if the current operating mode is for recording still picture data (S37). If not, as in step S33, the control unit 50 controls each system component so that moving picture input is recorded on the recording medium OD (S39). The received picture data are grouped into M_VOBs, and M_VOBIs regarding the M_VOBs are created and added in the M_AVFIT of the navigation data in the memory M1. The M_VOBs need to be presented seamlessly with the preceding M_VOBs because the moving picture data are obtained successively after the previously obtained moving picture data are recorded. Therefore, unlike step S35, the SML_FLG of the newly created M_VOBI is 1 and so the fields of VOB_FIRST_SCR and VOB_LAST_SCR are created and recorded in the SMLI. Also, the control unit 50 creates CIs regarding the recorded VOBs and adds the CIs to the ORG_PGCIT of the navigation data stored in the memory M1 (S41).

At step S43, the control unit 50 tests if end of the recording mode has been requested. If not, program control returns to step S37 wherein it is tested whether recording of still picture data has been requested. Unless requested, program control returns to step S39 and the above procedure is repeated. If a request has been received, step S47 is reached and recording of input still picture data begins. As in case of moving picture data, still picture data are recorded as a series of VOBs. After the first VOB of the input picture data is recorded, the control unit 50 creates a S_VOBI related to the first VOB and adds the S_VOBI to the S_AVFIT of the navigation data loaded in the memory M1. Also, the control unit 50 creates a CI regarding the recorded VOB and adds the CI to the ORG_PGCIT of the navigation data stored in the memory M1 (S49). The control unit 50 examines if end of the recording mode has been requested (S51). If not, program control returns to step S53 wherein it is tested whether recording of moving picture data has been requested. Unless requested, program control returns to step S47 and the above procedure is repeated. If a request has been received, program control returns to step S33 and steps S33 through S35 are repeated. In this case, the first VOB of new moving picture data does not need seamless presentation, and so the VOBI relevant to the VOB includes SMLI, SML_FLG of which is 0 as shown in FIG. 7A.

Meanwhile, end of recording mode has been requested at step S43 or S51, the control unit 50 copies the navigation data in the memory M1 to the recording medium OD and finishes control operation (S45)

Figure 10:
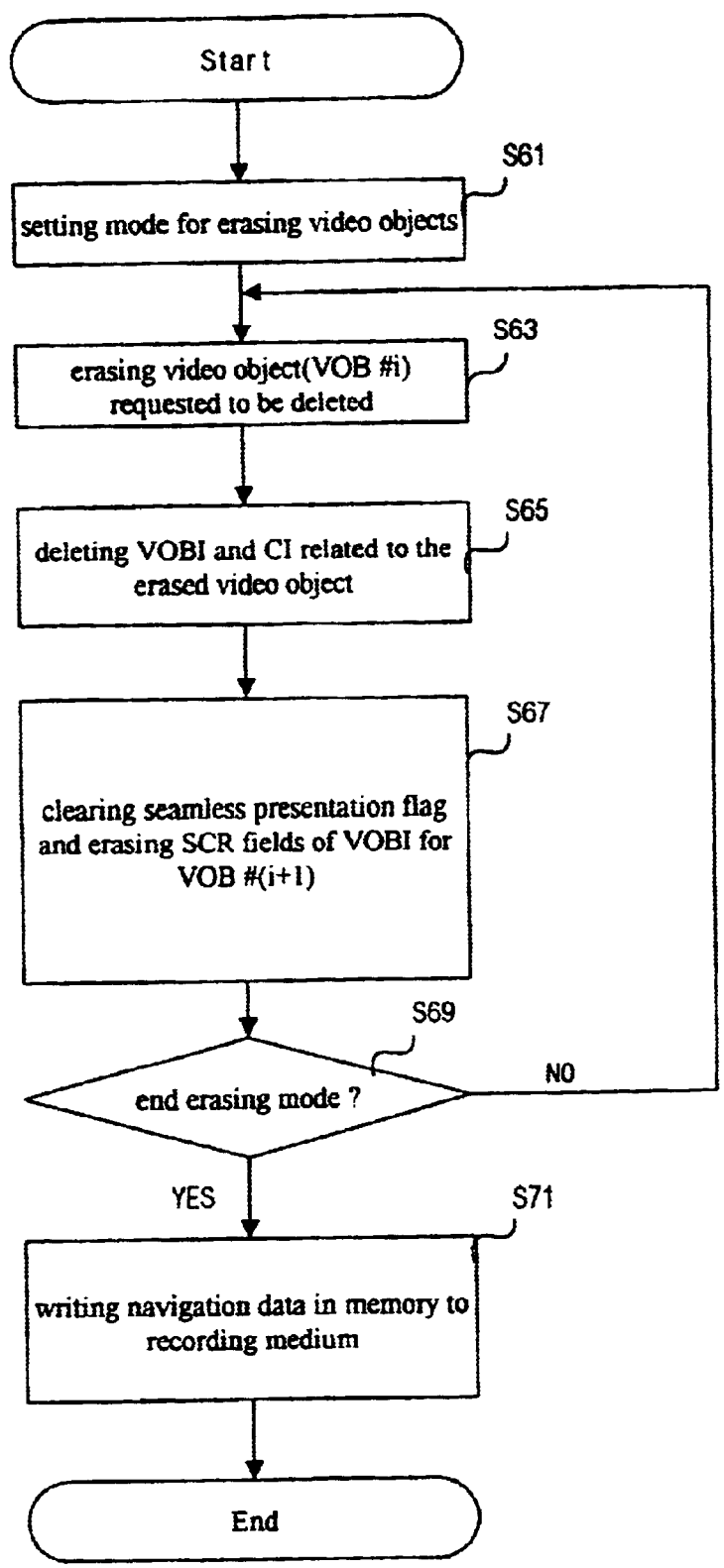
FIG. 10 is a flow chart showing the method for updating and recording seamless presentation information of moving picture data in a rewritable recording medium according to an embodiment of the present invention.

The method for updating and recording seamless presentation information of moving picture data in a rewritable recording medium according to an embodiment of the present invention is explained below in detail with reference to the flow chart shown in FIG. 10.

In response to a user's request, the control unit 50 begins execution of an erasing control routine, loading the navigation data file from the recording medium into the memory M1 (S61). Suppose that VOB#i is to be deleted. The control unit 50 reads navigation information VOBI#i related to VOB#i from the M_AVFIT or S_AVFIT. Referring to the information, the control unit 50 removes VOB#i from the recording medium OD.

Subsequently, the control unit 50 removes VOBI#i related to the deleted VOB#i from the M_AVFIT or S_AVFIT and removes CI related to the deleted VOB#i from the ORG_PGCIT.

The control unit 50 accesses M_VOBI#(i+1) to clear the SML_FLG of the SMLI, remove the fields of VOB_FIRST_SCR and VOB_LAST_SCR, and update the fields of VOB_A_STP_PTM and VOB_A_GAP_LEN (S67). As M_VOB#i is erased from the recording medium, continuity between M_VOB#(i+1) and M_VOB#(i−1) does not hold and seamless presentation is not needed. This is why the SML_FLAG of M_VOB#(i+1) is cleared.

At step 69, the control unit examines if the erasing mode ends. If not, program control returns to step S63. If so, the control unit 50 copies the navigation data in the memory to the recording medium, thereby completing the erasing control routine (S71).

The invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for creating a seamless presentation information structure for picture data, the method comprising the steps of:
   (a) grouping picture data into video objects;
   (b) determining whether to specify two successive video objects as a pair of video objects to be presented seamlessly;
   (c) setting a seamless presentation flag contained in seamless presentation information of one of the two successive video objects based the determination result;
   (d) determining whether or not to create certain information fields pertaining to seamless operation in the seamless presentation information, depending on the value of the seamless presentation flag; and
   (e) selectively creating said information fields in the seamless presentation information based on said determining (d) results.

2. A method according to claim 1, wherein said data grouping is performed based upon whether or not the picture data are received consecutively.

3. A method according to claim 1, wherein said data grouping is performed based upon the type of the picture data being received.

4. A method according to claim 3, wherein said type of the picture data is classified by whether the data being received are moving picture data or still picture data.

5. A method according to claim 1, wherein said step (b) comprises the steps of:
   comparing types of the two successive video objects; and
   determining whether to specify the two successive video objects as a pair of video objects to be presented seamlessly based on the comparison result.

6. A method according to claim 5, wherein said type of video object is classified by whether the video object is related to moving picture data or still picture data.

7. A method according to claim 1, wherein, in said step (d), said information fields include at least one field of system clock reference.

8. A method according to claim 7, wherein said at least one field of system clock reference comprises the last system clock reference field of the former of the two successive video objects and the first system clock reference of the latter of the two successive video objects.

9. A method according to claim 1, wherein, in the step (e), the seamless presentation flag has two possible values, and wherein said information fields pertaining to the seamless operation are created to exist in the seamless presentation information if the seamless presentation flag has a first value, and said information fields pertaining to the seamless operation are not created to exist in the seamless presentation information if the seamless presentation flag has a second value.

10. A method according to claim 9, wherein, in said step (e), said information fields include a last system clock reference field of the former of the two successive video objects, and a first system clock reference field of the latter of the two successive video objects.

11. An apparatus for creating a seamless presentation information structure for picture data, the apparatus comprising:
   means for grouping picture data into video objects;
   means for determining whether to specify two successive video objects as a pair of video objects to be presented seamlessly;
   means for setting a seamless presentation flag contained in seamless presentation information of one of the two successive video objects based on the determination result;
   means for determining whether or not to create certain information fields pertaining to seamless operation in the seamless presentation information, depending on the value of the seamless presentation flag; and
   means for selectively creating said information fields in the seamless presentation information based on the result of determining whether or not to create said information fields.

12. An apparatus according to claim 11, wherein said means for grouping groups said data based upon whether or not the picture data are received consecutively.

13. An apparatus according to claim 11, wherein said means for grouping groups said data based upon the type of the picture data being received.

14. An apparatus according to claim 13, wherein said type of the picture data is classified by whether the data being received are moving picture data or still picture data.

15. An apparatus according to claim 11, wherein said means for determining whether to specify the video objects includes:
   means for comparing types of the two successive video objects; and
   means for determining whether to specify the two successive video objects as a pair of video objects to be presented seamlessly based on the comparison result.

16. An apparatus according to claim 15, wherein said type of video object is classified by whether the video object is related to moving picture data or still picture data.

17. An apparatus according to claim 11, wherein said information fields being selectively created include at least one field of system clock reference.

18. An apparatus according to claim 17, wherein said at least one field of system clock reference comprises the last system clock reference field of the former of the two successive video objects and the first system clock reference of the latter of the two successive video objects.

19. An apparatus according to claim 11, wherein the seamless presentation flag has two possible values, and wherein said information fields pertaining to the seamless operation are created to exist in the seamless presentation information if the seamless presentation flag has a first value, and said information fields pertaining to the seamless operation are not created to exist in the seamless presentation information if the seamless presentation flag has a second value.

20. An apparatus according to claim 19, wherein said information fields include a last system clock reference field of the former of the two successive video objects, and a first system clock reference field of the latter of the two successive video objects.

21. A method for managing seamless presentation information of moving picture data in a rewritable recording medium, comprising the steps of:
   (a) erasing video objects requested to be deleted; and
   (b) updating seamless presentation information of the video object following the erased video objects.

22. A method according to claim 21, wherein said step (b) updates a seamless presentation flag in the seamless presentation information of the video object following the erased video objects.

23. A method according to claim 21, wherein said step (b) erases a field of system clock reference contained in navigation information for the video object following the erased video objects.

24. A data structure usable in recording seamless presentation information of picture data in a recording medium, the data structure comprising:
   navigation information pertaining to data files stored on the recording medium,
   the navigation information including seamless presentation information pertaining to seamless operation of the picture data,
   the seamless presentation information including a seamless presentation flag which indicates whether or not a seamless presentation is needed, and certain information fields existing or non-existing in the seamless presentation information depending on the value of the seamless presentation flag, said certain information fields pertaining to a seamless operation.

25. A data structure according to claim 24, wherein, if the seamless flag has a first value, then said certain information fields do not exist in the seamless presentation information.

26. A data structure according to claim 25, wherein, if the seamless presentation flag has a second value, then said certain information fields exist in the seamless presentation information.

27. A data structure according to claim 25, wherein the first value of the seamless presentation flag is "0".

28. A data structure according to claim 26, wherein the second value of the seamless presentation flag is "1".

29. A data structure according to claim 26, wherein said certain information fields include system clock reference fields pertaining to the seamless operation.

* * * * *